United States Patent
Takezoe et al.

(10) Patent No.: US 10,041,536 B2
(45) Date of Patent: Aug. 7, 2018

(54) SINTERED BEARING FOR MOTOR-TYPE FUEL PUMP WITH SUPERIOR CORROSION RESISTANCE, WEAR RESISTANCE AND CONFORMABILITY

(71) Applicant: Diamet Corporation, Niigata-shi (JP)

(72) Inventors: Shinichi Takezoe, Niigata (JP); Yoshinari Ishii, Niigata (JP)

(73) Assignee: DIAMET CORPORATION, Niigata-Shi (JP)

( * ) Notice: Subject to any disclaimer, the term of this patent is extended or adjusted under 35 U.S.C. 154(b) by 676 days.

(21) Appl. No.: 14/376,249

(22) PCT Filed: May 14, 2013

(86) PCT No.: PCT/JP2013/063375
§ 371 (c)(1),
(2) Date: Aug. 1, 2014

(87) PCT Pub. No.: WO2013/172326
PCT Pub. Date: Nov. 21, 2013

(65) Prior Publication Data
US 2014/0376845 A1 Dec. 25, 2014

(30) Foreign Application Priority Data

May 15, 2012 (JP) .................................. 2012-111481

(51) Int. Cl.
*F16C 33/12* (2006.01)
*C22C 1/04* (2006.01)
(Continued)

(52) U.S. Cl.
CPC .............. *F16C 33/121* (2013.01); *B22F 3/11* (2013.01); *C22C 1/04* (2013.01); *C22C 1/0425* (2013.01);
(Continued)

(58) Field of Classification Search
None
See application file for complete search history.

(56) References Cited

U.S. PATENT DOCUMENTS 6,524,365 B1 * 2/2003 Kanezaki .................. C22C 9/04
75/243
7,479,174 B2 * 1/2009 Shimizu .................. F04C 2/084
418/179
(Continued)

FOREIGN PATENT DOCUMENTS

JP  2001-192754 A  7/2001
JP  2002-180162 A  6/2002
(Continued)

OTHER PUBLICATIONS

Ni—Cu phase diagram, Apr. 1996.*
(Continued)

*Primary Examiner* — Xiaowei Su
(74) *Attorney, Agent, or Firm* — Leason Ellis LLP

(57) ABSTRACT

A bearing for a motor-type fuel pump comprises a Zn—P—Ni—Sn—C—Cu-based sintered alloy and has corrosion resistance to a coarse gasoline containing sulfur or an organic acid(s); superior wear resistance; and superior conformability with a shaft as a counterpart. The bearing is suitable for use in a downsized fuel pump and has a structure in which a base comprises 3 to 13% by mass of Zn, 0.1 to 0.9% by mass of P, 10 to 21% by mass of Ni, 3 to 12% by mass of Sn, 1 to 8% by mass of C and a remainder composed of Cu and inevitable impurities. The base also comprises a solid solution phase of a Zn—Ni—Sn—Cu alloy. A Sn alloy phase containing no less than 15% by mass of Sn is formed in grain boundaries of the base. Pores have a porosity of 8 to 18% and free graphite distributed therein.

4 Claims, 2 Drawing Sheets

(51) Int. Cl.
- *C22C 9/04* (2006.01)
- *C22C 13/00* (2006.01)
- *C22C 9/06* (2006.01)
- *C22C 1/08* (2006.01)
- *F16C 33/16* (2006.01)
- *C22C 19/03* (2006.01)
- *B22F 3/11* (2006.01)

(52) U.S. Cl.
CPC .............. *C22C 1/0483* (2013.01); *C22C 1/08* (2013.01); *C22C 9/04* (2013.01); *C22C 9/06* (2013.01); *C22C 13/00* (2013.01); *C22C 19/03* (2013.01); *F16C 33/128* (2013.01); *F16C 33/16* (2013.01); *F16C 2204/10* (2013.01); *F16C 2204/14* (2013.01)

(56) References Cited

U.S. PATENT DOCUMENTS

| | | | |
|---|---|---|---|
| 8,999,232 B2* | 4/2015 | Ishii | C22C 1/0425 420/472 |
| 2002/0197149 A1 | 12/2002 | Kanezaki et al. | |
| 2007/0258668 A1* | 11/2007 | Shimizu | C22C 9/02 384/28 |
| 2009/0011268 A1* | 1/2009 | Shimizu | C22C 1/0425 428/550 |

FOREIGN PATENT DOCUMENTS

| | | | | |
|---|---|---|---|---|
| JP | 2005-314807 A | 11/2005 | | |
| JP | 2006-199977 A | 8/2006 | | |
| JP | WO 2012063785 A1 * | 5/2012 | .......... | C22C 1/0425 |
| JP | 2013-237898 A | 11/2013 | | |

OTHER PUBLICATIONS

Office Action dated Jun. 28, 2016 for the corresponding Japanese Patent Application No. 2015-105136.
Office Action dated Jul. 1, 2016 for the corresponding Chinese Patent Application No. 201380005255.0.
Office Action dated Jul. 14, 2015 for the corresponding Chinese application No. 201380005255.0.
Office Action dated Feb. 24, 2015 for the corresponding Japanese Application No. 2012-111481.
International Search Report dated Aug. 6, 2013 for the corresponding PCT Application No. PCT/JP2013/063375.
Office Action dated Mar. 8, 2016 for the corresponding Chinese Patent Application No. 201380005255.0.

* cited by examiner

US 10,041,536 B2

SINTERED BEARING FOR MOTOR-TYPE FUEL PUMP WITH SUPERIOR CORROSION RESISTANCE, WEAR RESISTANCE AND CONFORMABILITY

CROSS-REFERENCE TO RELATED PATENT APPLICATIONS

This application is a U.S. National Phase Application under 35 U.S.C. § 371 of International Patent Application No. PCT/JP2013/063375, filed May 14, 2013, and claims the benefit of Japanese Patent Application No. 2012-111481, filed on May 15, 2012, all of which are incorporated by reference in their entirety herein. The International Application was published in Japanese on Nov. 21, 2013 as International Publication No. WO/2013/172326, under PCT Article 21(2).

FIELD OF THE INVENTION

The present invention relates to a bearing for a motor-type fuel pump. The bearing comprises a Zn—P—Ni—Sn—C—Cu-based sintered alloy exhibiting a superior corrosion resistance and wear resistance.

BACKGROUND OF THE INVENTION

An electronically-controlled gasoline injection device with a motor-type fuel pump built therein, has been widely used due to the fact that the device is effective in saving a fuel consumption of an automobile and cleaning an exhaust gas thereof.

A reduction in a size and weight of an automobile engine has become a strong trend in recent years. For this reason, not only a fuel pump such as the one shown in FIG. 3 has been downsized, but a bearing used in such fuel pump has also been either downsized or thin-walled. Meanwhile, a discharging performance of a motor is maintained at the same level as before. That is, it is required that a bearing used in a motor-type fuel pump exhibit a superior wear resistance even when exposed to a high-pressure gasoline flowing at a high speed.

In fact, automobiles have spread across various regions around the world due to the globalization of the automobile market in recent years. However, the qualities of liquid fuels such as gasoline that are used in each country around the world are diverse, and there are regions where coarse gasoline with a large amount of sulfur or an organic acid(s) contained in fuels are used inevitably. Here, as a result of using such coarse gasoline containing sulfur or an organic acid(s), there exists a problem where a bearing of a motor-type fuel pump corrodes due to sulfur and the organic acid(s); and where a life of the bearing shortens due to, for example, a decrease in strength of the bearing or a motor lock trouble.

In order to solve the aforementioned problem, as to a fuel whose impurities contain sulfur or a compound(s) thereof, there have been disclosed in Japanese Unexamined Patent Application Publications No. 2001-192754 and No. 2002-180162, for example, bearings for motor-type fuel pump that comprise a Cu—Ni-based sintered alloy. Further, as to a fuel such as a coarse gasoline containing an organic acid(s) or the like, there has been disclosed in Patent document 3: Japanese Unexamined Patent Application Publication No. 2006-199977, for example, a bearing made of a Cu—Ni-based sintered alloy having a structure in which a Sn highly-concentrated alloy phase is formed.

Problem to be Solved by the Invention

Although the bearings disclosed in Japanese Unexamined Patent Application Publications No. 2001-192754 and No. 2002-180162 have superior wear resistances and exhibit superior corrosion resistances to a coarse gasoline containing sulfur, corrosion resistances of these bearings to a coarse gasoline containing an organic acid(s) have never been sufficient. Further, as for the bearing disclosed in Japanese Unexamined Patent Application Publication No. 2006-199977, although the bearing has a superior wear resistance and exhibits a superior corrosion resistance to a coarse gasoline containing an organic acid(s), there exists a problem where, for example, since this bearing as a bearing used in a motor-type fuel pump is inferior to the bearings of Japanese Unexamined Patent Application Publications No. 2001-192754 and No. 2002-180162 in conformability with a shaft member as a counterpart, a load may be high at the beginning of motor drive, thus resulting in an excessive motor electric current.

The present invention has been made to solve the aforementioned problem, and it is an object of the present invention to provide a novel sintered bearing for motor-type fuel pump that is composed of a Zn—P—Ni—Sn—C—Cu-based sintered alloy; and is suitable even for use in a downsized fuel pump, since the sintered bearing exhibits a corrosion resistance to a coarse gasoline containing sulfur and an organic acid(s), a superior wear resistance and a superior conformability with a shaft as a counterpart.

SUMMARY OF THE INVENTION

Means to Solve the Problem

In order to improve the conformability of the bearing disclosed in Japanese Unexamined Patent Application Publication No. 2006-199977, it was considered that decreasing the amount of either Ni or Sn could be effective. However, the corrosion resistance of the bearing of the Japanese Unexamined Patent Application Publication No. 2006-199977 to a coarse gasoline containing sulfur or an organic acid(s) decreases as the amount of Ni or Sn decreases. That is, the conformability and the corrosion resistance are contradictory to each other in nature with respect to the amount of Ni or Sn. Here, as a result of earnestly studying how to improve the conformability by decreasing the amount of Ni or Sn and ensure the corrosion resistance to a coarse gasoline containing sulfur or an organic acid(s) at the same time, developed was a bearing member having a Zn—P—Ni—Sn—C—Cu-based alloy component and a metal structure in which a Sn alloy phase containing not smaller than (i.e., no less than) 15% by mass of Sn is formed in grain boundaries of a base comprising a solid solution phase of a Zn—Ni—Sn—Cu alloy; pores are dispersed and distributed in the base at a rate of 8 to 18%; and free graphite is distributed in the pores. Therefore, this bearing member is superior in wear resistance; conformability with a shaft member as a counterpart; and corrosion resistance to a coarse gasoline containing sulfur or an organic acid(s).

Particularly, the bearing for motor-type fuel pump of the present invention has a structure in which a base comprises 3 to 13% by mass of Zn, 0.1 to 0.9% by mass of P, 10 to 21% by mass of Ni, 3 to 12% by mass of Sn, 1 to 8% by mass of C and a remainder composed of Cu and inevitable impurities; said base comprises a solid solution phase of a Zn—Ni—Sn—Cu alloy; a Sn alloy phase containing not smaller than 15% by mass of Sn is formed in grain boundaries of said base; a porosity of 8 to 18% is exhibited; and free graphite is distributed in pores.

Further, the Sn alloy phase containing not smaller than 15% by mass of Sn, comprises 0.1 to 5.0% by mass of Zn; 0.4 to 1.5% by mass of P; 20 to 35% by mass of Cu; 20 to 43.5% by mass of Ni; and a remainder composed of Sn and inevitable impurities.

Effects of the Invention

The sintered bearing for motor-type fuel pump of the present invention exhibits a superior corrosion resistance, a superior wear resistance and a superior conformability with a shaft member as a counterpart not only in a normal liquid fuel such as a gasoline, but also in a liquid fuel such as a coarse gasoline containing especially sulfur or an organic acid(s) at high concentration, thereby making it possible to provide a motor-type fuel pump having a long-term reliability even when using a coarse liquid fuel.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Figure 1:
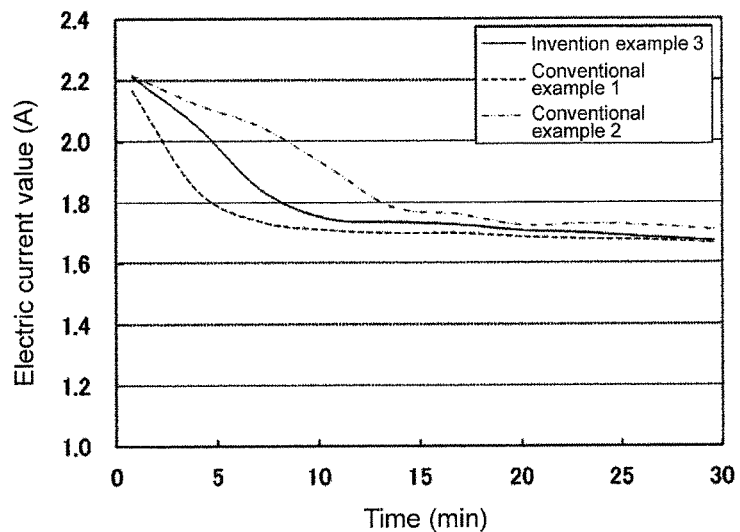
FIG. 1 is a graph showing a change in a motor electric current value with time at the beginning of driving a motor-type fuel pump in a conformability test of a working example 1.
Figure 2:
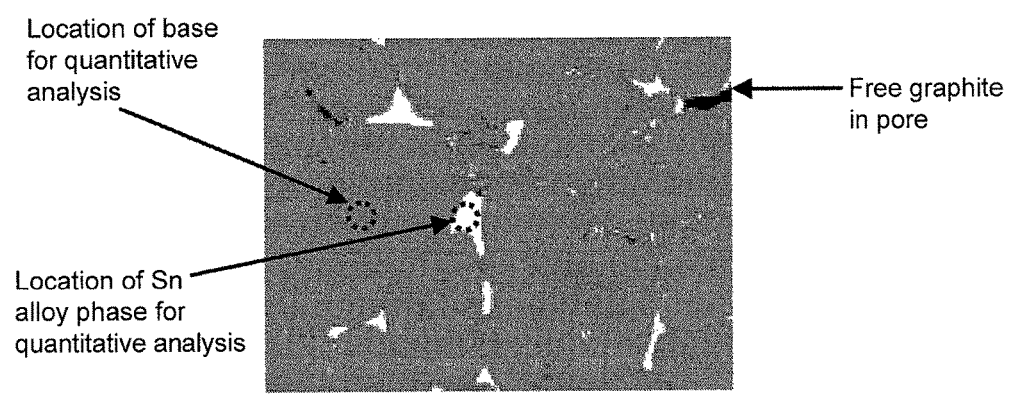
FIG. 2 is an electron-microscopic structural photograph obtained by performing electron probe micro-analyzer in the working example 1.
Figure 3:
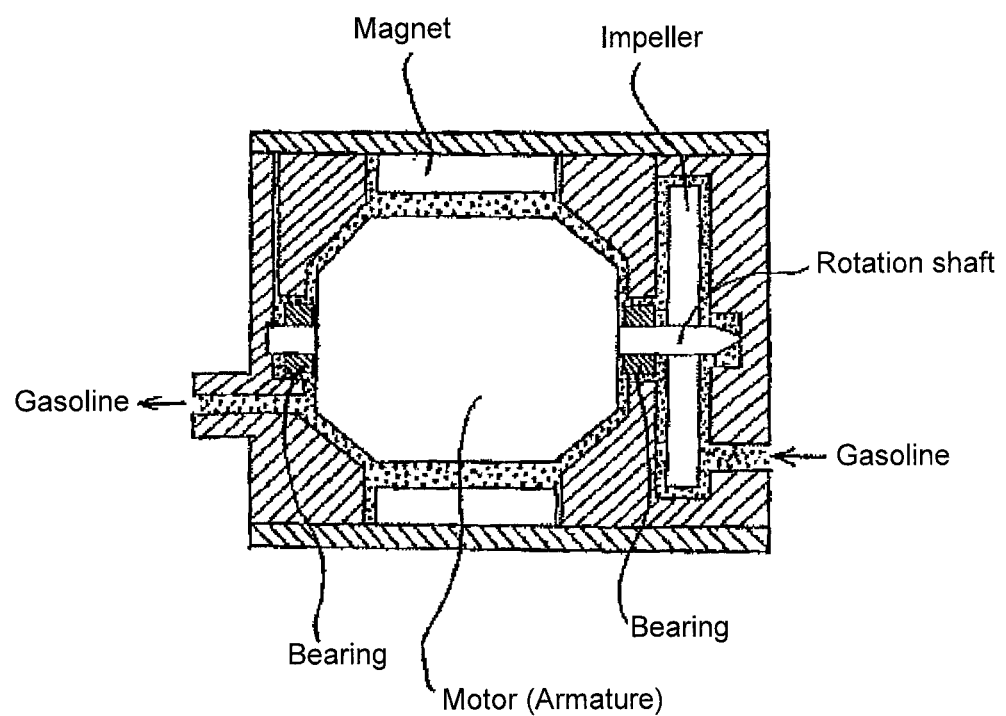
FIG. 3 is a cross-sectional diagram showing a structure of a motor-type fuel pump for use in a gasoline engine.

A sintered bearing for motor-type fuel pump of the present invention has a following structure. That is, a base of the sintered bearing of the present invention comprises 3 to 13% by mass of Zn; 0.1 to 0.9% by mass of P; 10 to 21% by mass of Ni; 3 to 12% by mass of Sn; 1 to 8% by mass of C; and a remainder composed of Cu and inevitable impurities. Further, a Sn alloy phase containing not smaller than 15% of Sn is formed in grain boundaries of the base comprising a solid solution phase of a Zn—Ni—Sn—Cu alloy. Furthermore, the sintered bearing of the present invention has a porosity of 8 to 18%, and free graphite is distributed in pores. Since the base comprises the solid solution phase of the Zn—Ni—Sn—Cu alloy, and the Sn alloy phase is formed in the grain boundaries, this bearing for motor-type fuel pump exhibits a superior conformability with a shaft member as a counterpart; a sulfur tolerance; an organic acid resistance; and a superior wear resistance.

Described in detail hereunder are a composition and others of the sintered bearing for motor-type fuel pump of the present invention. Particularly, the contained amounts described hereunder are all expressed in the form of % by mass.

(1) Zn: 3 to 13% by Mass

Zn has a corrosion resistance to a gasoline containing sulfur, and forms through sintering the solid solution phase of the Zn—Ni—Sn—Cu alloy together with Ni, Sn and Cu, thus bringing about a superior corrosion resistance and conformability to the bearing. However, a desired corrosion resistance and conformability cannot be achieved when the amount of Zn contained is smaller than 3%. Meanwhile, it is not preferable when the amount of Zn contained is larger than 13%, because a corrosion resistance to a gasoline containing an organic acid(s) decreases in such case.

(2) P: 0.1 to 0.9% by Mass

P promotes a sinterability of a powder compact and improves a strength of the bearing. After undergoing sintering, P is contained in a large amount in grain boundaries of a metal structure. A sufficient sinterability effect cannot be achieved when the amount of P contained is smaller than 0.1%. Meanwhile, it is not preferable when the amount of P contained is larger than 0.9%, because changes in dimensions are significant in such case at the time of performing sintering and a dimension precision of the bearing product thereby decreases.

(3) Ni: 10 to 21% by Mass

Ni brings about a superior strength, wear resistance and corrosion resistance, and forms through sintering the solid solution phase of the Zn—Ni—Sn—Cu alloy together with Zn, Sn and Cu. Further, Ni forms through sintering the Sn alloy phase in the grain boundaries together with P, Sn and Cu, thus bringing about a superior strength, wear resistance and corrosion resistance to the bearing. A superior corrosion resistance cannot be achieved when the amount of Ni contained is smaller than 10%. Meanwhile, it is not preferable when the amount of Ni contained is larger than 21%, because a raw material cost is high in such case while only a little effect of improving the corrosion resistance is expected.

(4) Sn: 3 to 12% by Mass

Sn forms through sintering the Sn alloy phase in the grain boundaries together with Ni, Sn and P, and brings about a superior corrosion resistance to the bearing by forming a base comprising a solid solution phase of a Zn—Ni—P—Sn—Cu alloy together with Zn, Ni, P and Cu. The grain boundary phase cannot be formed sufficiently and a desired corrosion resistance can thus not be achieved, when the amount of Sn contained is smaller than 3%. Meanwhile, it is not preferable when the amount of Sn contained is larger than 12%, because, in such case, only a little effect of improving the corrosion resistance is expected; the changes in the dimensions are actually significant at the time of performing sintering, and the dimension precision of the bearing product thereby decreases.

(5) C: 1 to 8% by Mass

C is derived from graphite. C mainly exists as free graphite in the pores that are dispersed and distributed in the base, brings about a superior lubricity to the bearing and thus improves the wear resistance. A desired effect cannot be achieved, when the amount of C contained is smaller than 1%. Meanwhile, it is not preferable when the amount of C contained is larger than 8%, because, in such case, only a little effect of improving the wear resistance is expected and the strength of the bearing drastically decreases.

(6) Porosity: 8 to 18%

Pores are dispersed in the base and have an effect of buffering a strong friction inflicted on the bearing subjected to a high-pressure and high-speed flow of a liquid fuel; and thus controlling the wear of the bearing. However, this effect is not sufficient if the porosity is lower than 8%. Meanwhile, it is not preferable when the porosity is higher than 18%, because the strength significantly decreases in such case.

(7) Sn Alloy Phase Containing not Smaller Than 15% by Mass of Sn

The Sn alloy phase containing not smaller than 15% by mass of Sn is formed in the grain boundaries of the base, and brings about a superior corrosion resistance to the bearing subjected to a coarse gasoline containing an organic acid(s).

The Sn alloy phase containing not smaller than 15% by mass of Sn is formed as follows. That is, as raw material powders, a Cu—Ni alloy powder or a Zn—Ni—Cu alloy powder; a Sn powder; a Cu—P powder; a Cu—Zn powder and a graphite powder are combined and mixed together in a manner such that a composition of the mixed raw material powder be that containing 3 to 13% by mass of Zn; 0.1 to 0.9% by mass of P; 10 to 21% by mass of Ni; 3 to 12% by mass of Sn; 1 to 8% by mass of C; and a remainder composed of Cu and inevitable impurities. A powder compact is then formed using the mixed raw material powder, followed by sintering the same while controlling a temperature for sintering from 840 to 930° C. The powder compact thus sintered is then immediately and rapidly cooled at a cooling rate of not lower than 15° C./min. In this way, the Sn alloy phase containing not smaller than 15% by mass of Sn can be efficiently formed in the grain boundaries of the base. Particularly, the Sn alloy phase formed under the aforementioned conditions contains 0.1 to 5.0% by mass of Zn; 0.4 to 1.5% by mass of P; 20 to 35% by mass of Cu; 20 to 43.5% by mass of Ni; and a remainder composed of Sn and inevitable impurities.

Described hereunder is a specific working example of the sintered bearing for motor-type fuel pump of the present invention. However, the present invention is not limited to the following working example, but may employ various modified working examples.

Working Example 1

(1) Production of Sintered Bearing for Motor-Type Fuel Pump

As raw material powders, prepared were a Cu-30% by mass Ni alloy powder; a Cu-25% by mass Ni alloy powder; a Cu-20% by mass Ni alloy powder; a Cu-15% by mass Ni alloy powder; a Cu-8% by mass P alloy powder; a Sn powder; a Cu-30% by mass Zn alloy powder; a Cu-20% by mass Zn alloy powder; a Cu-40% by mass Zn alloy powder; a Cu—Ni—Zn alloy powder; a graphite powder; and a Cu powder, each of which has a given average particle diameter within a range of 30 to 100 μm. These raw material powders were combined together in accordance with each composition shown in Table 1, and then mixed using a V-type mixer for 20 minutes. The raw material powders thus mixed were then press-molded with a given pressure to obtain a powder compact. Next, this powder compact was sintered at a given temperature within a range of 840 to 930° C. under an endothermic gas (endothermic-type gas) atmosphere; rapidly cooled thereafter at a cooling rate of not lower than 15° C./min; and then subjected to sizing. Here, the endothermic gas atmosphere was generated by passing a mixture of a natural gas and air through a heated catalyst such that a decomposition and conversion reaction could take place. Through the aforementioned steps, produced in accordance with the compositions shown in Table 1 were the bearings of the present invention (referred to as invention examples hereunder), conventional bearings and comparative bearings, each bearing being formed into a size of outer diameter: 10 mm×inner diameter: 5 mm×height: 5 mm.

As a result of performing metal structure observation on each invention example through an electron probe microanalyzer, it was confirmed that a metal structure of each invention example had a structure in which a base comprised a solid solution phase of a Zn—Ni—Sn—Cu alloy; a Sn alloy phase containing not smaller than 15% by mass of Sn was formed in grain boundaries of the base; a porosity of 8 to 18% was exhibited; and graphite was dispersed and distributed in pores.

(2) Wear Resistance Test

A wear resistance test was performed on the bearings of the invention examples, the conventional examples and the comparative examples under a condition where a gasoline flowed at a high speed in a narrow space; and each bearing was exposed to the fast-flowing gasoline while being subjected to a high pressure incurred by a high-speed rotation of a motor causing the high-speed flow of the gasoline.

Each bearing was installed in a fuel pump having an external size of length: 110 mm×diameter: 40 mm, and this fuel pump was further installed in a gasoline tank. An actual machine test was then performed under a condition where the number of revolutions of an impeller was 5,000 to 15,000 rpm; a gasoline flow rate was 50 to 250 liter/hour; a pressure applied to the bearing due to the high-speed rotation was 500 kPa at a maximum; and a test time was 500 hours. A maximum worn depth on a bearing surface was measured after performing the test. The results thereof are shown in Table 1.

It was confirmed that the maximum worn depth of each bearing of the invention examples was not larger than 2.8 μm, and that the bearings of the invention examples had superior wear resistances.

(3) Corrosion Resistance Test

A corrosion resistance test was performed on the bearings of the invention examples, the conventional examples and the comparative examples.

A sulfur test solution was prepared by adding sulfur to a gasoline, and was used as a simulated coarse gasoline. An organic-acid test solution was prepared by adding to a gasoline a carboxylic acid represented by RCOOH (R represents either a hydrogen atom or a hydrocarbon group), the organic-acid test solution also being used as a simulated coarse gasoline. The sulfur test solution and the organic-acid test solution were then heated to a temperature of 60° C., followed by dipping the bearings of the invention examples, the conventional examples and the comparative examples into each of the sulfur test solution and the organic-acid test solution for 500 hours. Next, measured was a rate of change in mass before and after dipping each bearing in the sulfur test solution and the organic-acid test solution. Table 1 shows the results of the changes in mass that were observed in the corrosion resistance test.

As for the invention examples, the change in mass of each bearing dipped in the sulfur test solution was not larger than 0.12%; and the change in mass of each bearing dipped in the organic-acid test solution was not larger than 0.38%. That is, it was confirmed that the invention examples had exhibited high corrosion resistances in terms of both a sulfur resistance and an organic acid resistance.

Meanwhile, as for the comparative examples, a bearing of a comparative example 5 exhibited a low corrosion resistance to the sulfur test solution with a change in mass thereof being 0.35%. Other comparative examples exhibited high sulfur resistances to the sulfur test solution with their changes in mass being not larger than 0.15%. However, these comparative examples exhibited corrosion resistances to the organic-acid test solution that were significantly lower than those of the invention examples, with their changes in mass being 0.56 to 0.70%.

Further, as for the conventional examples, while a conventional example 1 containing no Sn exhibited a high sulfur resistance, the organic acid resistance thereof was significantly lower than those of the invention examples. A conventional example 2 containing Sn; and Ni in an amount larger than those of the invention examples substantially exhibited the same level of the corrosion resistance as the invention examples in terms of both the sulfur resistance and the organic acid resistance.

(4) Confo Inability Test

Each bearing of an invention example 3, the conventional example 1 and the conventional example 2 was installed in a motor, and an electric current consumed as a result of being continuously driven was then measured for 30 minutes. The results thereof are shown in FIG. 1. Electric current values of motors using the bearing of the invention example 3 and the bearing of the conventional example 1 that contains no Sn, had decreased and stabilized in a period of time shorter than that using the bearing of the conventional example 2 that contains Sn; and a large amount of Ni. Further, the electric current values of the motors using the bearings of the invention example 3 and the conventional example 1 remained low after stabilization. Therefore, it was confirmed that the bearing of the present invention was superior to the bearing of the conventional example 2 in initial conformability.

(5) Analysis by Electron Probe Micro-Analyzer

As for an alloy of the invention example 3, an electron probe micro-analyzer (EPMA) was used to perform quantitative analysis on Zn, P, Ni, Sn and Cu with regard to the base comprising the solid solution phase of the Zn—Ni—Sn—Cu alloy and the Sn alloy phase that is formed in the grain boundaries and contains not smaller than 15% by mass of Sn. Here, the conditions for analysis were as follows. That is, an accelerating voltage was set to be 15 kV; a beam diameter was set to be $\phi 1$ μm. For example, as shown in an electron-microscopic structural photograph (COMPO image), the Zn—Ni—Sn—Cu alloy phase and the Sn alloy phase formed in the grain boundaries were respectively measured at five locations, followed by calculating average values thereof. The results thus obtained are shown in Table 2. However, these results of analysis were obtained by analyzing not the entire composition, but particular regions in the metal structure. Further, C was excluded from the elements on which quantitative analysis was to be performed due to the fact that C, as an alloy ingredient element, mostly existed as free graphite in the pores dispersed and distributed in the base.

As for the alloy of the invention example 3, it was confirmed that the Zn—Ni—Sn—Cu alloy phase existed in the base and that the Sn alloy phase containing not smaller than 15% by mass of Sn existed in the grain boundaries of the base.

TABLE 1

| Bearing | | Ingredient composition (% by mass) | | | | | | Porosity (%) | Maximum worn depth (μm) | Change in mass due to corrosion resistance test | |
|---|---|---|---|---|---|---|---|---|---|---|---|
| | | Zn | P | Ni | Sn | C | Cu | | | Sulfur tolerance (%) | Organic acid resistance (%) |
| Invention example | 1 | 7.7 | 0.4 | 17.5 | 3 | 4 | Remainder | 14.7 | 2.0 | 0.11 | 0.24 |
| | 2 | 6.8 | 0.4 | 17.5 | 6 | 5 | Remainder | 13.2 | 1.4 | 0.07 | 0.21 |
| | 3 | 6.8 | 0.4 | 18.5 | 7.5 | 4 | Remainder | 12.2 | 1.1 | 0.08 | 0.15 |
| | 4 | 5.9 | 0.4 | 17 | 9 | 5 | Remainder | 10.8 | 1.2 | 0.08 | 0.17 |
| | 5 | 5 | 0.4 | 18 | 12 | 4 | Remainder | 12.8 | 1.4 | 0.07 | 0.28 |
| | 6 | 5.1 | 0.3 | 21 | 5 | 4 | Remainder | 13.2 | 1.5 | 0.07 | 0.19 |
| | 7 | 6 | 0.3 | 20 | 6 | 4 | Remainder | 11.7 | 1.8 | 0.05 | 0.18 |
| | 8 | 10.8 | 0.3 | 15 | 6 | 4 | Remainder | 12.4 | 1.6 | 0.09 | 0.34 |
| | 9 | 12.9 | 0.3 | 10.5 | 9 | 6 | Remainder | 16.3 | 2.3 | 0.12 | 0.37 |
| | 10 | 13.2 | 0.3 | 10.5 | 11 | 6 | Remainder | 13.9 | 2.8 | 0.08 | 0.36 |
| | 11 | 2.7 | 0.4 | 17 | 6 | 4 | Remainder | 10.7 | 2 | 0.16 | 0.35 |
| | 12 | 4.8 | 0.3 | 18 | 5 | 4 | Remainder | 12.5 | 2.4 | 0.06 | 0.31 |
| | 13 | 8.0 | 0.3 | 17 | 4 | 4 | Remainder | 11.4 | 2.0 | 0.07 | 0.36 |
| | 14 | 9.5 | 0.3 | 17.5 | 5 | 4 | Remainder | 12.8 | 2.4 | 0.05 | 0.28 |
| | 15 | 10.7 | 0.3 | 15.3 | 6 | 4 | Remainder | 15.5 | 2.5 | 0.07 | 0.34 |
| | 16 | 12.8 | 0.3 | 16.4 | 9 | 4 | Remainder | 17.6 | 2.2 | 0.12 | 0.38 |
| Conventional example | 1 | 17.3 | 0.52 | 15.4 | — | 4.5 | Remainder | 10.2 | 1.1 | 0.11 | 0.78 |
| | 2 | — | 0.5 | 28.2 | 8.9 | 4.8 | Remainder | 13.2 | 1.1 | 0.10 | 0.30 |
| Comparative example | 1 | 8.3 | 0.4 | 18 | 1 | 4 | Remainder | 15.6 | 4.1 | 0.15 | 0.65 |
| | 2 | 4.1 | 0.4 | 20 | 13 | 4 | Remainder | 9.8 | 1.8 | 0.08 | 0.57 |
| | 3 | 13.8 | 0.3 | 12 | 6 | 4 | Remainder | 14.4 | 2.1 | 0.11 | 0.61 |
| | 4 | 14.4 | 0.3 | 9 | 12 | 6 | Remainder | 13.1 | 2.5 | 0.15 | 0.89 |
| | 5 | 1.8 | 0.3 | 11 | 6 | 4 | Remainder | 12.7 | 2.2 | 0.35 | 0.70 |
| | 6 | 14.2 | 0.3 | 15.3 | 6 | 4 | Remainder | 13.3 | 2.8 | 0.10 | 0.70 |

TABLE 2

| | | Analysis value (mass %) | | | | |
|---|---|---|---|---|---|---|
| | | Zn | P | Ni | Sn | Cu |
| Invention example 3 | Base | 6.3 | 0.1 | 20.7 | 8.2 | Remainder |
| | Sn alloy phase | 0.7 | 0.9 | Remainder | 35.5 | 26.4 |

The invention claimed is:

1. A sintered bearing for a fuel pump, comprising:
a base that contains 3 to 9.5% by mass of Zn, 0.1 to 0.9% by mass of P, 10 to 20% by mass of Ni, 3 to 12% by mass of Sn, 1 to 8% by mass of C and a remainder of Cu and inevitable impurities, wherein
a solid solution phase of a Zn—Ni—Sn—Cu alloy is formed in said base,
a Sn alloy phase is formed in grain boundaries of said base and contains no less than 15% by mass of Sn, the grain boundaries being formed between two grains,
pores are formed at a porosity of 8 to 18% and have free graphite distributed therein,
the Sn alloy phase is formed through steps of mixing, press-molding, sintering and cooling and
the Sn alloy phase comprises 0.1 to 5.0% by mass of Zn, 0.4 to 1.5% by mass of P, 20 to 35% by mass of Cu, 20 to 43.5% by mass of Ni and a remainder of Sn and inevitable impurities.

2. The sintered bearing according to claim 1, wherein the Sn alloy phase is produced from raw material powders containing a Zn—Ni—Cu alloy powder, a Sn powder, a Cu—P powder, a Cu—Zn powder and a graphite powder.

3. The sintered bearing according to claim 2, wherein the raw material powders are mixed and sintered under an endothermic gas atmosphere.

4. The sintered bearing according to claim 1, wherein the cooling step is performed at a cooling rate of not lower than 15° C./min.

* * * * *